J. L. CREVELING.
ELECTRIC REGULATION.
APPLICATION FILED OCT. 24, 1914. RENEWED NOV. 28, 1919.
1,394,148.
Patented Oct. 18, 1921.
2 SHEETS—SHEET 1.
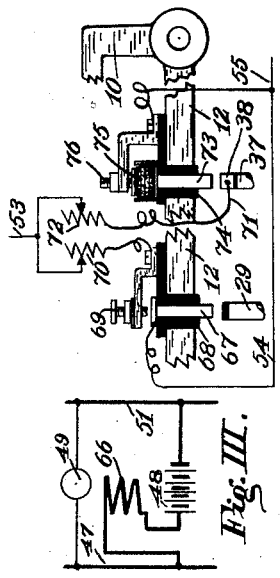
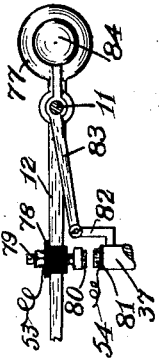
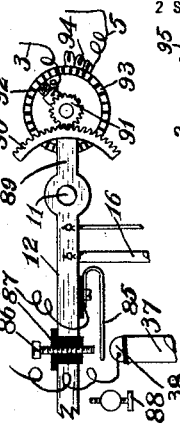
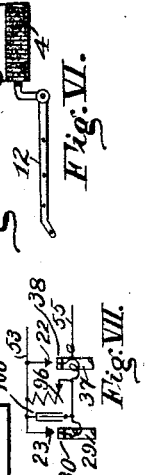
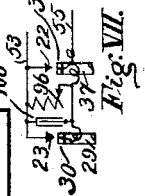
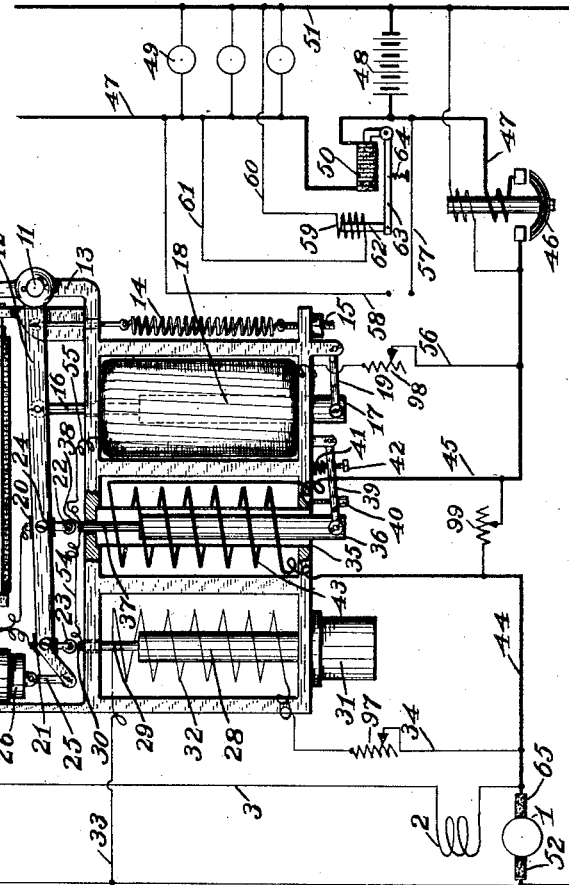
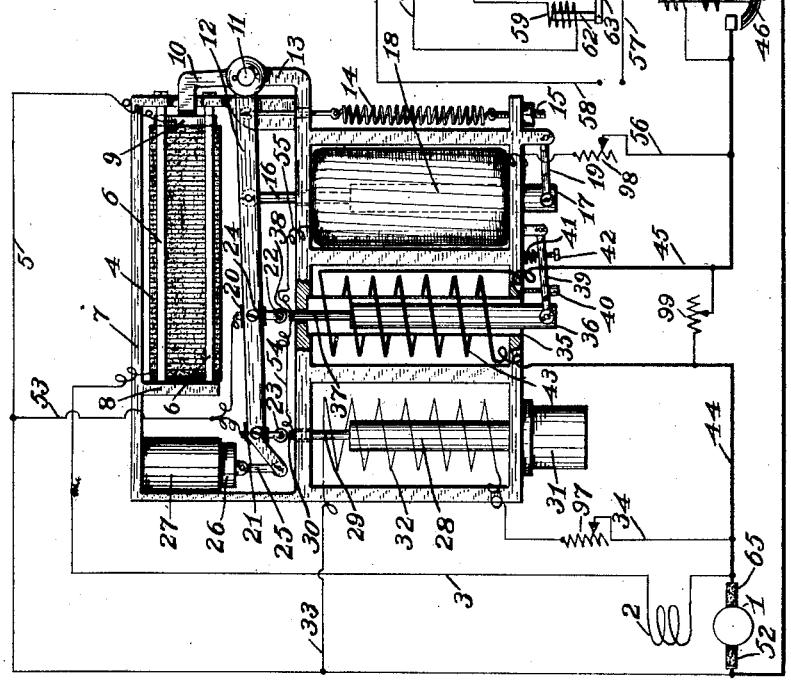
WITNESSES
INVENTOR
John L. Creveling

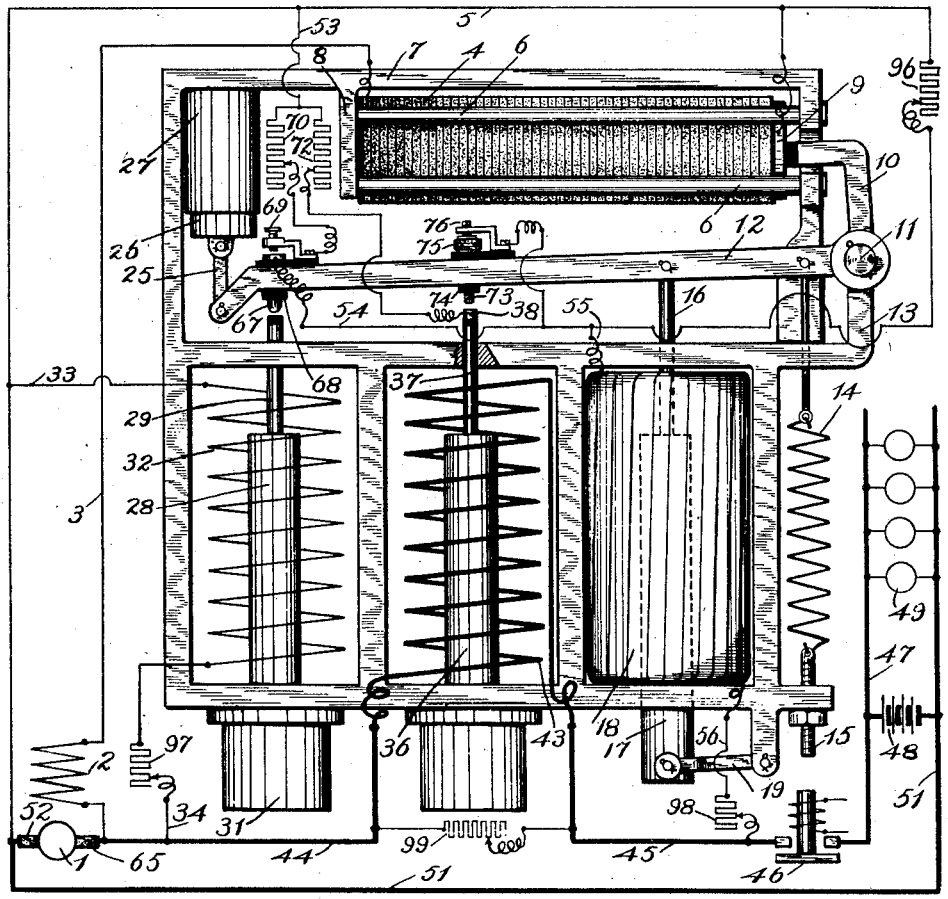
Fig. II.

UNITED STATES PATENT OFFICE.

JOHN L. CREVELING, OF AUBURN, NEW YORK.

ELECTRIC REGULATION.

1,394,148. Specification of Letters Patent. Patented Oct. 18, 1921.

Application filed October 24, 1914, Serial No. 868,403. Renewed November 28, 1919. Serial No. 341,292.

*To all whom it may concern:*

Be it known that I, JOHN L. CREVELING, a citizen of the United States, residing at Auburn, in the county of Cayuga and State of New York, have invented new and useful Improvements in Electric Regulation, set forth in the annexed specification and drawing, forming a part thereof.

My invention pertains to that class of electric regulation wherein it is desired to regulate a dynamo electric machine, and has for its particular object to provide means whereby such a machine will be automatically governed. As my invention is particularly applicable to that type of electric systems wherein a dynamo driven at widely varying speeds is used to charge a storage battery and operate lamps or other translating devices, it will be described more particularly with reference to such systems.

Figure I. is a diagrammatic representation of an electric system including one embodiment of my invention, and wherein the specific means portraying the same may be considered as shown, more or less completely, in elevation.

Fig. II. is a similar illustration of a system employing a modified form of embodiment of my invention.

Fig. III. is a diagrammatic representation of a modification of one portion of the systems shown in Figs. I and II.

Figs. IV. and V. each represent modifications of apparatus which may be employed in systems similar to Figs. I and II, in employing my invention.

Fig. VI. is a diagrammatic representation of a modified form of some of the instrumentalities shown in Figs. I and II, for employing my invention.

Fig. VII. is a modification of a portion of the apparatus shown in Fig. I.

Fig. VIII. is a fragmentary view and partial section of a portion of the apparatus shown in Fig. II, portraying more completely the details thereof.

In Fig. I., 1 represents a dynamo or generator driven at varying speeds and provided with the usual field coil 2, having one of its terminals connected with one lead, as shown, and the other terminal carried as by wire 3 to one terminal of a regulating element, in this instance indicated as a carbon pile resistance 4, having its other terminal connected with the opposite lead of the generator as by wire 5.

It will therefore be noted, that the generator may be regulated by manipulation of the regulating resistance 4. The carbon pile 4 in a preferred type of embodiment of my invention is supported by insulating rods 6, which in turn are supported by the frame 7, provided with a depending portion 8, against which the carbon pile is pressed by the member 9, carried by the lever 10; the carbon pile being insulated from the member 8, and the conducting member 9 being insulated from the lever 10, as indicated. The lever 10 is pivoted at 11, and is connected with the longer lever 12 to form what might be termed a bell crank lever operating about the pivot 11, carried by the member 13 of the frame 7.

14 is a spring, adjustable as by screw 15, and tending to draw the lever 12 downwardly in such manner as to compress the carbon pile 4 and lower the resistance thereof.

16 is a rod or stem, preferably of nonmagnetic material, pivotally attached to the lever 12 at one extremity, as indicated, and having its other extremity attached to the core of iron or other magnetic material indicated at 17, which is surrounded by a magnet winding indicated at 18 in the form of a mummified coil, which when excited tends to lift the core 17 against the action of spring 14 and decrease the pressure upon the pile 4.

19 is a link pivotally connected with the core 17 and with an extension of the frame 7, and shows one means whereby the core 17 may be held in proper operative relation within the coil 18. The lever 12 is provided with two insulating bushings 20 and 21, within which are adjustably carried the contact members 22 and 23, in this instance indicated as provided with small rollers.

25 represents a link connecting the free end of the lever 12 with the plunger 26, operating within the cylinder 27 to form a dashpot, which prevents too sudden movement being imparted to the lever 12, it being obvious that any kind of suitable dashpot desired may be employed.

28 is a core of magnetic material provided with the stem 29, of non-magnetic material, passing freely through an opening in the frame 7, and provided at its upper extremity with a contact member 30, insulated from the member 29, as indicated.

31 represents a dashpot, which may be connected with the core 28, to prevent too sudden movement, and if desired, may be arranged in such manner as to guide the core 28 and allow the same free movement only in an upward or downward direction. The core 28 is surrounded by a fine winding, indicated diagrammatically at 32, in shunt across the generator as by wires 33 and 34, through an adjustable resistance 97, it being obvious that any suitable type of spool-wound or mummy coil may be used in practice.

35 shows, in section, a tube of brass or other non-magnetic material carried in openings in the frame 7 in such manner as to form a suitable means for holding either spools or mummy coils in their proper relation to the movable cores within the frame 7, and is one form of construction which may be used for holding any or all of the coils in place, and in this instance is shown as having therein the core 36 provided with the stem of non-magnetic material 37 passing through a free opening in the frame 7, and provided at its upper extremity with a contact member 38 insulated therefrom, as indicated. The lower extremity of the core 36 may be guided during its free upward and downward movement within the tube 35, and held as nearly as necessary in a true central position with regard to any winding around the tube 35, by means of the lever or link 39 pivotally connected with the extremity of the core 36 and with a boss or extension of the frame 7. If desired, the limit of downward movement of the core 36 may be adjusted as by means of the adjusting screw 40, the head of which engages the link, while the threaded portion thereof passes through a free opening therein and is threaded into the frame 7. The pull necessary to raise the core 36 may be adjusted as by the spring 41 and adjustment screw 42.

It will be obvious that any type of suitable dashpot may be used in connection with the core 36, to prevent too sudden motion of the same. Also, the core 28 may be arranged in the same manner as the core 36, and vice versa.

Further, it will be obvious that either of the cores may be connected with spring adjustments, as indicated for controlling the core 36, or the weight of the core and dashpot plunger may be used in place of any such spring adjustments, if properly proportioned.

43 indicates diagrammatically, a coarse winding surrounding the core 36, and tending, when energized, to lift the same against the action of spring 41. The coil 43 is connected with one brush 65 of the generator as by the lead 44 and by the lead 45 with one terminal of the automatic switch 46, from which the lead 47 is carried to one side of the storage battery 48, and then through a regulating element, indicated at 50, to one side of the lamps or other translating devices 49. Return from the translating devices 49 and battery 48 is made by lead 51 to the brush 52. The adjustable shunt 99 may be placed across the coil 43 if desired for the purpose of adjustment. The contact members 22 and 23 are connected as by wire 53 with the wire 5. The contact members 30 and 38 are connected together as by means of flexible connection 54, and are connected to one terminal of the coil 18, as indicated at 55. The remaining terminal of the coil 18 is connected to the lead 45 as by means of the wire 56 through an adjustable resistance 98.

Therefore, it will be noted that the coil 18 is in shunt across the generator leads when contact is made either at 22—38 or 23—30. If desired, the wire 56 may be connected with the wire 57 instead of the lead 45, and then the coil 18 will be in shunt across the battery-charging circuit when contact is made at 22—38 or 23—30, as above described. Or, the wire 56 may be connected with the wire 58 instead of the lead 45, and then the coil 18 will be placed in shunt across the translation circuit when the said contacts are made, as may be deemed desirable.

59 diagrammatically represents a voltage solenoid in shunt across the lamp or translation circuit as by means of wires 60 and 61, and tending, when excited, to lift the core 62 and swing the lever 63 in an upward direction against the action of spring 64, so as to increase the resistance 50, indicated in this instance as a carbon pile, in such manner as to hold the voltage upon the translation circuit constant throughout fluctations in voltage across the generator circuit in a well known manner.

In Fig. II. there are shown two types of modifications of contacting members, which may be used in place of the members indicated at 22 and 23 in Fig. I. The details of these members are shown more fully in Fig. VIII. The contacting member on the left side of the said Fig. II. is shown as comprising a movable plunger of conducting material 67, carried within an insulating bushing 68 upon the arm or lever 12. Above the movable member 67 is placed an adjustable contact screw 69, as indicated. The member 67 is connected to the wire 54, as is the member 30, for example, in Fig. I. The member 69 is connected to the wire 53 through an adjustable resistance 70, if desired. The terminal rod or stem 29, of non-magnetic material, is provided at its extremity with an insulating cap, as indicated, so that when the stem 29 is raised it will strike the member 67 and cause the same to be raised, and make contact with the adjustable screw 69, which contact may be adjusted by operation of the said screw. In this figure the stem indicated at 37 is shown as having an insulated portion 38, the same as shown in Fig. I. This insulated portion is connected with the wire 53 as by means of the variable resistance 72, if desired, for the purpose of adjustment.

Above the stem 37 the lever 12 supports the movable conducting member or plunger 73, carried within the insulated bushing 74, and carrying upon its upper side the small carbon pile 75, above which is the adjusting screw 76, in electrical connection with the wire 55. Thus, when the stem 37 is brought into contact with the member 73 the circuit may be established through the coil 18 in series with the carbon pile 75, which may have its resistance varied from an open circuit to a small amount, by proper adjustment of the screw 76.

In Fig. III. there is shown a modification of a portion of the systems of Figs. I and II, in that the series coil 43, in the main circuit in the said figures, is suppressed and replaced by the coil 66 in series with a portion of the load, in this instance indicated as that portion used for charging the battery 48.

In Fig. IV. I have shown the lever 12 as provided with still another type of contact device which may be used in place of the contacts 23—30 and 22—38 of Fig. I., or in place of the contact devices shown in Fig. II. In this form of contact device the stem 37 is shown as provided with a carbon tip insulated therefrom, as indicated at 81, which when raised, makes contact with the carbon tip 80, carried by adjustable screw 79, within the bushing 78, carried by the lever 12.

I have also shown the lever 12 as provided with a counterweight 77, which may be used if desired, to balance the lever against gravity. I have also shown the stem 37 as held in its central position as by means of the member 82, pivotally engaging the lever 83, revolving about the same center 11, as does the lever 12. Such an arrangement will of course avoid the friction of the stems 29 and 37 against their guiding openings in the frame shown in Figs. I. and II.

Further, I have also shown a counterweight 84, which may be used to balance the core 37, and other parts attached thereto, against the action of gravity, if desired.

In Fig. V. I have shown still another type of contacting device, in which an adjustable yielding movement is possible after electrical contact is established. For, it will be noted that, the stem 37 is provided with an insulated conducting member 38, similar to that shown in Fig. I., which when raised, will cause electrical communication with the spring member 85, which will yield until it comes in contact with the adjustable screw 86 within the insulated bushing 87, carried by the lever 12.

In this figure, I have also shown a different type of resistance or regulating element, which may be used in place of the carbon pile 4 of Figs. I and II. In that, I have shown the lever 12 as having its downward movement stopped as by the adjustable screw 88, and the said lever provided with the extension 89 carrying the segment or rack 90 engaging the pinion 91, which in turn is connected mechanically with, and insulated electrically from the contact member or brush 92, movable along the segments of a series of resistance controlling contacts of the commutator type, indicated at 93, a portion of the resistance elements being indicated as resistance wire loops, shown at 94, the majority of such loops being omitted for the sake of clearness.

In Fig. VI. I have shown the lever 12 as operating to lessen the pressure upon the carbon pile 4 when drawn in a downward direction, as by the spring 14 of Figs. I. and II. and to increase the pressure, and therefore decrease the resistance when moved in an upward direction, as by excitation of any of the windings in Figs. I. and II. Such manipulation of the resistance member 4 may be used to regulate the generator by shunting the field 2 when the said field is connected across the leads through a suitable resistance as indicated at 95.

In Fig. VII. I have diagrammatically indicated the contact members of Fig. I., and have shown a non-inductive resistance 96 in shunt to the contacts, for the purpose of preventing sparking at the contacts.

Fig. VIII. shows in partial section the contact devices of Fig. II, and plainly points out the details of one construction that may be used.

As this resistance is permanently across the breaks at 23—30 and 22—38, I preferably make the same adjustable, in order that I may control the current through the coil 18 at such time as the contacts are open, for a purpose which may be desirable at times, as will hereinafter appear. This resistance 96 is also illustrated in Fig. II.

100 represents a condenser which may be used either alone or in conjunction with the resistance 96 across the above mentioned breaks, in order to reduce sparking, if desired.

The operation of that embodiment of my invention shown in Fig. I. is substantially as follows:

If the generator 1 be at rest, switch 46 will be open, and the lamps or translating devices 49 may be operated by the storage battery 48, through the regulating element 50. And, I so adjust the spring 64 that if the normal working voltage of the battery be exceeded, as for example, when the same is in a highly charged state, the coils 59 will raise the core 62 so as to move the lever 63 against the action of spring 64, and insert sufficient resistance 50 to bring the voltage of the translation circuit to its normal value, in a well known manner common to systems of this character.

If now, the generator have its armature revolved, current will flow from the positive brush 65 through the field winding 2, wire 3, carbon pile 4, and wire 5, to the negative brush 52, and cause the field to build up in a well known manner. And, it will be obvious that the spring 14 will tend to compress the carbon pile 4 and lower its resistance to the minimum.

If now, the generator speed be increased until its voltage be slightly in excess of the storage battery 48, the automatic switch 46 will close, and current will flow through the lead 44, coil 43, lead 45, switch 46, and lead 47, to the storage battery 48 and through the regulator 50 to translating devices 49, and return through the lead 51 to the negative brush of the generator 52. This current flowing to the work may all flow through the coil 43, or a portion thereof may be shunted around the said coil by means of the variable resistance shunt 99, for the purpose of adjustment, as desired. And, I so adjust the spring 41, by means of the screw 42 or I adjust the variable resistance 99, or both, as may be desirable, that when the maximum current desired to be delivered by the generator 1 is reached, the coil 43 will cause the core 36 to be raised, and bring the contact member 38 into contact with the member 22, and thus allow current to flow from the lead 45, through the wire 56 and adjustable resistance 98, to the coil 18, from which return is made through the wire 55, contact 22—38, and wire 53, to wire 5 and the negative brush of the generator 52.

The current traversing the fine coil 18 will tend to lift the plunger 17, and raise the lever 12 in such manner as to swing the lever 10, and decrease the pressure upon the carbon pile 4, and increase the resistance thereof.

And one form of adjustment preferred by me, is to so adjust the resistance 98 and the spring 14 that when this circuit through the coil 18 is completed, and the voltage of the generator is substantially normal, the coil 18 will be very nearly able to lift the core 17 and increase the resistance 4. Then very slight upward pressure exerted against the contact 22 by contact 38, owing to the coil 43 tending to raise the core 36 and stem 37, will swing the lever 12, and increase the resistance 4, in such manner as to prevent this maximum desired current from being exceeded by the generator.

Thus it will be obvious that the generator current may be very closely held from exceeding a predetermined limit throughout wide changes in speed of the generator above the speed causing the desired maximum current.

If now the generator speed be lessened, and the current output fall slightly, the lifting effort of the coil 43 will diminish, and the spring 14 will cause the lever 12 to swing downwardly, and decrease the resistance 4 in such manner as to tend to hold the current output constant. And, if the current output fall appreciably below the normal maximum, the coil 43 will allow the core 36 to descend and break the contact 22—38, and allow the full spring pressure 14 to be exerted upon the carbon pile 4, to reduce its resistance to the minimum.

Throughout the operation above described, it will be noted that the coil 18 during its operation was in shunt across the generator mains. Therefore, increases in voltage across the generator would also tend to increase the resistance 4, and in that manner coil 18 would coöperate with the coil 43 in a tendency to prevent both current and voltage from rising, and in this way add to the delicacy of the dominant current regulating operation, inasmuch as current rises are usually due to voltage increase at the generator under some conditions of operation, for which this particular system is very applicable.

Further, if the wire 56 be connected with the wire 57 instead of the lead 45, the coöperation of the two coils in the above operation will be substantially as above described. But, at such time as the generator is inoperative, the terminal 56 of the coil 18 will be across a live branch of the circuit, which connection may be preferred for some uses of my invention.

However, if the wire 56 be connected with the wire 58, the coil 18, when excited, will always be across a constant potential circuit, rendered so by the operation of the translation circuit regulating resistance 50, in such manner that rises in generator voltage will in no way affect the operation of the coil 18. This adjustment or connection may be preferable under some conditions, when using my invention, and is comprehended thereby.

During the operation of the generator, current will also flow from the positive lead 44, through the wire 34 and regulating resistance 97, and through the voltage coil 32 and wire 33 to wire 5 and the negative brush of the generator 52. And I so adjust the resistance 97 that when the maximum desired voltage is reached, the current flowing in the coil 32 will cause the core 28 to be raised, and by lifting the stem 29 close the contact 23—30. If this rise in voltage take place at a time when the current is insufficient to cause contact at 22—38, the establishing of the contact at 23—30 will cause current to flow through the coil 18, as previously described when considering the making of the contact at 22—38.

Any increase in voltage above this desired maximum will cause the core 28 to be lifted, and an upward pressure exerted against the member 23, which pressure, even though slight, with the lifting tendency on the coil 18, as above outlined, will cause the lever 12 to be raised and the resistance 4 increased, in such manner as to prevent the voltage of the generator exceeding this pre-determined limit throughout wide increase in speed of the generator, during which this voltage may be held constant within very narrow limits.

It will be obvious, that with the coil 18 connected by wire 56 with the lead 45, or with this connection shifted from lead 45 to the wire 57, both coils 32 and 18 will be in multiple across the generator and tend to increase their effort upon rises in generator voltage, and in this way coöperate in holding the generator voltage constant at this maximum value, within a very narrow margin.

If at any time while the voltage coil 32 is regulating the generator to hold its voltage from increasing beyond the pre-determined limit, the current shall tend to increase beyond the maximum desired limit, as for example, upon reduction of resistance of the work circuit, the core 36 will be raised as above described, and cause contact at 22—38. And, if the current increases slightly above the desired maximum, the mechanical pressure exerted at the contact 22—38 will lift the lever 12 and increase resistance 4 in such manner as to hold this current from being exceeded. This action, brought about by the coil 43, will lower the voltage across the coil 32 and cause less pressure to be exerted by the action of this coil at the contact 23—30. And if the current tend to increase sufficiently, the coil 43 will cause the voltage to be cut down until the coil 32 is no longer able to maintain the contact at 23—30 and the core 28 may return to its original position indicated in the drawing, and the generator will be regulated by the current coil, as first explained.

If now, while so operating under current control, the voltage necessary to maintain this current shall rise to the maximum desired limit, as for example, as the storage battery 48 becomes charged, the current in the coil 32 will cause the core 28 to be lifted and contact established at 23—30. And if the voltage rise sufficiently to cause appreciable tendency of the coil 32 to lift the lever 12, the same will be raised, and the generator will become voltage regulated, as above set forth. And, if the storage battery voltage continue to rise, as its charging is more nearly completed, the current in the coil 43 will decrease, and the core 36 may return to its inoperative position, as indicated in the drawing, and further increase in the electromotive-force of the storage battery will cause the charging current to the same gradually to taper off to practically zero.

In the foregoing it will be obvious that the dashpot 26—27 may be arranged so as to prevent too sudden movement or "hunting" of the lever 12. Also, that both cores 28 and 36 may be provided with dashpots 31, if desired, and be adjusted by controlling the resistances 97 and 99 to so proportion the current in the said coils that they will lift their respective cores, together with whatever parts may be attached thereto within the dashpots, against the action of gravity. Or, each of the cores 28 and 36 may be arranged as 36 is shown, and held in its proper position upon the link or lever, and adjusted by a spring 41, through the instrumentality of an adjusting screw, as indicated at 42.

From the foregoing description it will be noted that the resistance 4 may, if desired, be held under its maximum compression, and thus at its minimum value, throughout all operation of the generator until the same tend to exceed either the voltage or current limits for which the regulating devices are adjusted. And that as soon as either the voltage or current tends to increase beyond these pre-determined limits, very small increments will be able to relieve the pressure upon the pile 4 and increase the resistance thereof, and hold the current or voltage, as may be the case, very closely to this maximum value.

For, as the generator tends to exceed either of these limits there is brought into action not merely the instrumentalities mechanically operated directly by the voltage and current limiting coils, but also the coil 18, which, for want of a better name, may be called a motor coil, to assist which the current and voltage coils operate both as mechanical and electrical relays, so to speak.

It will be obvious that I may increase the resistance 98, if desired, and increase the mechanical work thrown upon either of the regulating coils 32 or 43. Or, I may decrease the resistance 98 and lessen the mechanical work to be performed through the instrumentality of said coils, and even decrease the work to a negative quantity, if desired, so that contact either at 23—30 or 22—38 will cause the current in the coil 18 to lift the lever 12 without mechanical assistance from the other coils, even to the point of breaking circuit at the said contacts, which, it is obvious would cause the cores to vibrate, and cause the lever 12 to vibrate very slightly. And this may be so adjusted that these rapid vibrations in effect would cause practically constant regulation, in a well known manner.

If at any time the generator speed be lessened until its voltage fall to a value slightly below that of the storage battery, a slight back discharge through the switch 46 will cause the same to open in a well-known manner, and the generator will then be running below its critical speed and substantially inoperative, while the translating devices may be operated from the battery 48, as at the beginning of the above outlined operation.

In that modification shown in Fig. II. the system may operate in the same manner as described with reference to Fig. I. However, if the stems 29 and 37 be arranged as the stem 29 is indicated in Figs. II. and VIII., then, when raised by action of their respective solenoids, they will cause the plungers 67 to be raised until they meet the adjustable screws 69, when electrical communication will be established through the coil 18, in the same manner as above described with reference to Fig. I.

However, if that arrangement shown as applied to the stem 37 in this figure, be used in connection with the stems 29 and 37, electrical communication with the coil 18 will be established when either of the stems is lifted by its respective coil and comes into contact with the member 73, provided the adjustment of the screw 76 be such that there is no break at the carbon pile 75. However, the electrical connection with the coil 18 will be through the resistance of the carbon pile 75, which may be considerable when the stem merely touches the member 73, and may be reduced gradually to a low limit as pressure is exerted by the lifting tendency of the respective solenoids.

It will be noted that, the modifications portrayed in this Fig. II. may be used exactly as shown in the said figure,—that is, one modification may be used in connection with one stem 29, and the other modification in connection with one stem 37, or vice versa, or both stems may be equipped with contact devices like either one portrayed in the figure.

And, it will be noted, that the variable resistances 70 and 72 in series with the wire 53, may be used for the purpose of adjustment, in such manner that the electrical contact at 67—69 may be through a certain resistance, and the contact at 38—73—75—76 through a different amount of resistance, in such a way that the strength of the coil 18 may be caused to vary, depending upon which of the solenoids 32 or 43 be causing the said coil 18 to act.

Furthermore, if both the resistances 70 and 72 have appreciable value, the coil 18 will be strongest at the moment both solenoids will cause contacts to be closed at 67—69 and 38—73—75—76. Therefore, when either of the said solenoids is causing the regulation, and the other takes hold, coil 18 may be slightly strengthened to make the choice, as it were, between the other two coils as to which shall operate the system, an easier and more delicate matter.

If that modification shown in Fig. III be employed in connection with the systems of Fig. I or Fig. II, the operation will be as outlined above, with the exception that the core 36 and its stem 37 will be operated in response to fluctuations in the coil 66 instead of the coil 43, and, therefore, in response to current fluctuations in the battery circuit instead of the generator main circuit, as described with respect to Figs. I and II.

In that modification shown in Fig. IV., which may be equally well applied to both operating stems 29 and 37, even though illustrated with reference to stem 37 merely, for sake of simplicity, it will be noted that, inasmuch as the counterweight 77 is designed to balance the lever 12 and members attached thereto against gravity, this form may be quite useful in systems wherein the regulating means is subjected to severe vibration.

This is also true with respect to the solenoid cores, which may be balanced by counterweights, as indicated at 84. Otherwise, the contacting members will operate in substantially the same manner as those shown in Fig. I., except that, inasmuch as the contacting members 80 and 81 are made of carbon, the resistance of the contact will vary somewhat in the desired direction, depending upon the pressure applied upon the contact. That is, when the contact 81, for example, presses lightly against the contact 80 the resistance may be considerable, and will diminish as the pressure is increased. In this way the coil 18 may be brought somewhat gradually into play, and therefore may be so arranged as to be incapable of lifting the lever 12 with slight pressure between the contacts, and more nearly able to perform the entire operation of lifting the lever upon slight increase in pressure at the contacts, which of course will make the co-operation of the two coils operating the regulator very delicate, as is desired.

Further, sparking at these contacts will cause little injury when made of carbon, and they may be made readily renewable.

Further, this material for this particular purpose has the advantage of being cheap.

In that modification shown in Fig. V., and referring to that portion of the figure which portrays the contacting device operated by the stem 37, it will be obvious that both stems 37 and 29 may be arranged in the manner that the single one is shown illustrated here, for sake of simplicity.

And, with this construction it will be noted that the coil 18 may be brought into play by contact member 38 being raised until it touches the spring contact member 85, and then the spring contact will yield until arrested by the adjustable screw 86, before any mechanical assistance beyond that chosen for the spring 85 will be given to the coil 18 by the means of mechanical upward pressure of the stem.

And it will be obvious that with this arrangement the stem and lever 12 may have their relationship varied slightly mechanically, while the electrical relationship between the stem and the coil 18 will remain the same, as the contact, for example, 38—85, will within certain limits, remain established.

The regulating mechanism,—that is, the resistance device of this figure may be substituted bodily for the carbon pile 4 and its operative connection with the lever 12 in Figs. I and II.

And it will be obvious that motion imparted to the lever 12, as fully described with reference to Figs. I and II., may cause the extension of the lever 12, indicated at 89, to swing the rack or segment 90, and revolve the pinion 91, and thus revolve the contact brush 92 in such manner as to increase the resistance 94, connected with the contacts 93, in such manner that swinging the lever 12 upwardly will increase the resistance in series between the wires 3 and 5 as shown in this figure, and perform the same function in regulating the generator as is performed by the carbon pile 4 in Figs. I and II.

Further, it will be noted that my invention is particularly applicable to this type of resistance controlling mechanism.

For, when the lever 12 is to be lifted, I can so adjust the resistance in series with the coil 18 that, when the contacts 23—30 or 22—38 are closed, this coil 18 may be sufficiently energized that, with very little mechanical assistance from the coil which establishes the contact above mentioned, the brush 92 or equivalent means, may be moved against the inevitable friction of such devices, and the regulation in this direction accomplished upon a very slight increase in either current or voltage, depending upon which of the said coils is causing the regulation.

And, if now, the current or voltage coil, whichever may be operative, shall lessen its upward pressure, and the lever 12 fail to respond as quickly as it should, owing perhaps to some increased friction in the resistance contacting device, the circuit may be opened at the contact 23—30 or 22—38, as the case may be, and the coil 18 cut out altogether, which will cause spring 14 to rapidly swing the lever 12 downwardly to its proper position in such emergency.

In that modification shown in Fig. VI. the lever 12 may be operated as shown in Figs. I and II., and there may be further incorporated any of the modifications shown in Figs. III. and IV. Or that modification of resistance device shown in Fig. V. may be substituted for the carbon pile shown in Fig. V., it only being necessary that the upward movement of the lever 12 shall decrease the resistance 94, instead of increasing it, as mentioned in the operation with reference to Figs. I. and V. And, in order that decrease of resistance will cut down the generator field, and thus regulate its voltage to impress only a maximum current or maximum voltage upon the line, as described with reference to Fig. I., it is only necessary that the resistance element shown at 4 in Fig. VI. be connected in shunt around the field winding 2, and that the field winding 2, together with its shunt, be connected across the generator through a resistance indicated at 95, and of such dimensions that shunting of the field 2 may be accomplished without undue heat and waste.

In that modification shown in Fig. VII. there appears a variable resistance 96 and a condenser 100, both of which are shown as in multiple with the breaks 23—30 and 22—38. Either or both of these devices may be added in the constructions shown in any of the preceding figures and the resistance 96 is so shown in Fig. II.

The condenser 100 may be used for the mere purpose of assisting in reducing sparking when the circuit is broken at the contacts, in a well known manner.

The non-inductive resistance 96, however, may be used for this purpose in a well known manner, and may be sufficiently high in value to cause negligible effect upon the coil 18. However, its value may be reduced for the purpose of not only reducing the sparking, but also to cause an obvious adjustment of the coil 18, which, instead of having its circuit broken, will then be always in circuit through a high resistance which will be shunted out by the contacts when operating as described with reference to the figures above.

From the foregoing it will be noted that I have produced an improvement in electric regulation wherein a dynamo or generator may have both its voltage and current controlled in a predetermined manner, automatically and surely, and in a manner particularly applicable to those systems wherein a storage battery is charged with a variable speed dynamo.

And, it will be noted that the specific means employed in using my invention may vary widely in form and arrangement without departing from the spirit of my invention, and therefore. I do not wish in any way to limit myself to any details nor particular constructions of parts of the systems hereinabove set forth as merely to illustrate the embodiments of my invention.

For, it will be obvious that wide changes in the way of details and in the appearance and apparatus may be made without departing from the spirit and scope of my invention, which is as set forth in the following claims.

I claim—

1. In an electric system, a generator and means for regulating the same comprehending regulating means, means tending to operate the same, and means responsive to current fluctuations for controlling and also assisting said means.

2. In an electric system, a generator and means for regulating the same comprehending regulating means, means tending to operate the same, and means responsive to voltage fluctuations for controlling and also assisting said means.

3. In an electric system, a generator and means for regulating the same comprehending regulating means, means tending to operate the same, and means responsive to current and voltage fluctuations for controlling and assisting said means.

4. In an electric system, a generator and means for regulating the same comprehending regulating means, means tending to operate the same, means responsive to current fluctuations and means responsive to voltage fluctuations for controlling and assisting said means.

5. In an electric system, a generator, regulating means for controlling the same, electro-magnetic means tending to operate said means to decrease the voltage of the generator, combined with means for coöperating with and also controlling said electro-magnetic means responsive to current fluctuations, and means for controlling said means responsive to voltage fluctuations.

6. In an electric system, a generator, regulating means for controlling the same, electro-magnetic means tending to operate said means to alter the voltage of the generator, combined with means for coöperating with and also controlling said electro-magnetic means responsive to current fluctuations, and means for controlling said means responsive to voltage fluctuations.

7. In an electric system, a generator, regulating means for controlling the same, electro-magnetic means tending to operate said means to alter the voltage of the generator, combined with means for controlling said electro-magnetic means responsive to current fluctuations, and means for coöperating with and also controlling said means responsive to voltage fluctuations.

8. In an electric system, a generator, regulating means for controlling the same, electro-magnetic means tending to operate said means to alter the voltage of the generator, combined with means for coöperating with and also controlling said electro-magnetic means responsive to current fluctuations, and means for coöperating with and also controlling said means responsive to voltage fluctuations.

9. In an electric system, a generator, regulating means for controlling the same, electro-magnetic means tending to operate said means, combined with means for controlling said electro-magnetic means responsive to current fluctuations, and means for controlling said means responsive to voltage fluctuations, and means whereby the said responsive means assist the said magnetic means.

10. In an electric system, a generator, regulating means for controlling the same, electro-magnetic means tending to operate said means to alter the voltage of the generator, combined with means for controlling said electro-magnetic means responsive to current fluctuations, and means for controlling said means responsive to voltage fluctuations, and means whereby the said responsive means assist the said magnetic means and hold the current and voltage from exceeding predetermined limits.

11. In an electric system, a generator, regulating means for controlling the same, electro-magnetic means tending to operate said means, combined with means for controlling said electro-magnetic means responsive to current fluctuations, and means whereby the said responsive means assists the said magnetic means.

12. In an electric system, a generator, regulating means for controlling the same, electro-magnetic voltage operated means tending to operate said means, combined with means for controlling said means responsive to voltage fluctuations, and means whereby the said responsive means assists the said magnetic means.

13. The combination with a generator, of means for confining both its voltage and current within pre-determined limits, comprehending voltage responsive means, current responsive means, electro-magnetic means mechanically and electrically coöperating with both said last mentioned means and regulating means affected by said magnetic means when so coöperating.

14. The combination with a generator, of means for limiting the voltage of a circuit supplied thereby comprehending voltage responsive means, normally inoperative voltage responsive means coöperating therewith to mechanically assist the same, and regulating means for the generator affected by the coöperation of said means.

15. Electric regulating means, voltage responsive means affecting the same, and electromagnetic means coöperating with said responsive means to mechanically assist the same and responsive to voltage fluctuations.

16. The combination with electric regulating means, of current responsive means and voltage responsive means affecting the same, and normally inoperative electromagnetic means coöperating with each of the responsive means to mechanically assist the same in operating the regulating means.

17. The combination with electric regulating means, of a plurality of responsive means separately responsive to different electrical quantities affecting the regulating means, and electromagnetic motor means coöperating in common with said responsive means to assist the same in controlling the regulating means.

18. Electric regulating means, current responsive means and voltage responsive means for affecting the same, and electromagnetic motor means mechanically coöperating with at least one of said responsive means.

19. Means for regulating a generator comprehending a regulating device, voltage responsive means detached therefrom when inoperative and current responsive means detached therefrom when inoperative, combined with means whereby the current responsive means affects the regulating device when operative and whereby the voltage responsive means affects the regulating device when operative, each of the responsive means being able to affect the regulating means independently of the other responsive means.

20. The combination with a regulating device, of normally detached and independent voltage responsive means, normally detached and independent current responsive means, and means whereby each of said responsive means may affect said device independently of the other responsive means.

21. The combination with a regulating element and a movable member affecting said element, of current responsive means capable of independent operation affecting said movable member, and voltage responsive means capable of independent operation affecting said member, the arrangement of said responsive means being such that each may affect the movable member to operate the regulating element independently of the other.

22. Means for regulating a generator comprehending a regulating element, a movable member affecting said element, means responsive to voltage fluctuations and means responsive to current fluctuations, both said responsive means being affected by the generator and arranged to be capable of separately affecting said member to regulate the generator.

23. A regulator comprehending a variable resistance affected by variations in pressure, a lever for varying said pressure, current responsive means and means whereby the same independently affects the lever, and voltage responsive means and means whereby the same independently affects said lever.

24. A regulator comprehending a carbon pile, a lever controlling the same, current operated means and means whereby the same affects the lever combined with voltage operated means and means whereby the same affects the lever, the arrangement of the means whereby the responsive means affect the lever being such that each responsive means may affect the lever independently of the other responsive means.

25. The combination with a carbon pile of a lever controlling the pressure thereupon, voltage responsive means capable of movement without affecting said lever, current responsive means capable of movement without affecting said lever, both of said responsive means being adapted to independently affect said lever in response to fluctuations above predetermined values in the respective quantities measured thereby.

26. The combination with a carbon pile, movable means for exerting pressure thereupon, and adjustable means coöperating therewith to exert pressure upon said pile, of voltage responsive means and current responsive means each adapted to independently affect said movable means to lessen the pressure upon said pile when the voltage or current tend to increase beyond predetermined limits in value below which limits the responsive means are both normally inoperative.

27. The combination with a generator and a storage battery charged thereby, of a regulator for the generator comprehending a movable member affecting the operation of the generator, voltage responsive means capable of independently affecting said movable member and current responsive means capable of independently affecting said member in response to fluctuations in generator output including current to the battery, the arrangement of the responsive means being such that each may control the generator without being affected by the other.

28. In an electric system, a generator, regulating means for controlling the same and electromagnetic means tending to operate said means to decrease the voltage of the generator, combined with means for controlling said electromagnetic means responsive to current fluctuations, and means for controlling said means responsive to voltage fluctuations, and means whereby the said responsive means assist the said magnetic means, and means for adjusting the mutual relations of said means.

29. The combination with a variable resistance and lever mechanism the operation of which affects said resistance, of independently movable voltage responsive means and independently movable current responsive means each capable of independently affecting the lever mechanism, and means coöperating with each of said responsive means while the same is affecting the lever mechanism only.

30. The combination with a generator, of a regulating element for affecting the same, current responsive means for affecting said element, voltage responsive means for affecting said element, and means for varying the effect of the current responsive means affected by the operation of the voltage responsive means.

31. The combination with a generator, of a regulating element for affecting the same, current responsive means for affecting said element, voltage responsive means for affecting said element, and means for varying the effect of each of the responsive means affected by the operation of the other responsive means.

32. The combination with a generator, of means for controlling the same, current responsive means and voltage responsive means each capable of independently affecting said controlling means, and means for accelerating the act of one of the affecting means transferring control to the other affecting means when said other affecting means starts to assume control of the generator.

33. The combination with a variable speed generator and battery charged thereby, of means for controlling the generator, current responsive means and voltage responsive means each capable of independently affecting said controlling means, and means for accelerating the act of one of the affecting means transferring control to the other affecting means when said other affecting means starts to assume control of the generator in response to changes in condition of the battery.

34. The combination with a generator and storage battery charged thereby, of a regulating element affecting the generator, means affected upon changes in battery voltage adapted to control said element, means affected by current changes adapted to control said element, and means for accelerating the change from one controlling means to the other controlling means.

35. The combination with a generator of a device for affecting the operation thereof, means for controlling said device to affect the generator in response to current fluctuations, means for controlling said device to affect the generator in response to voltage fluctuations, and means coöperating with the responsive means whereby as each responsive means assumes control it varies the operating effect of the other responsive means.

36. The combination with a generator, of means for confining both its voltage and current within predetermined limits comprehending voltage responsive means, current responsive means, electromagnetic means simultaneously coöperating with both said last mentioned means and regulating means affected by said electromagnetic means when so coöperating and also by the responsive means.

37. The combination with a generator and means for regulating the same in response to voltage fluctuations and in response to current fluctuations wherein there is a transition period during which control of the generator is transferred from responsive to one of the above named electrical quantities to the other, of means for modifying the length of said transition period.

38. The combination with a generator and means for regulating the same in response to voltage fluctuations and in response to current fluctuations wherein there is a transition period during which control of the generator is transferred from responsive to one of the above named electrical quantities to the other, of means for modifying the operation of the responsive means during the transition period.

39. The combination with a generator and means for automatically controlling the same to regulate both the current in a circuit supplied thereby and the voltage upon a circuit supplied thereby and wherein the control of the generator is automatically shifted from current control to voltage control under certain conditions, and from voltage control to current control under other conditions, and wherein current control is accompanied by a falling off in voltage and voltage control is accompanied by a falling off in current, of means for accelerating said falling off when the control is shifted from one of said quantities to the other.

40. The combination with a generator and means for controlling the same in response to current fluctuations and in response to voltage fluctuations wherein the control in response to one of said quantities is accompanied by a diminution of the other quantity of means for affecting the rate of said diminution.

41. The combination with a generator, a battery charged thereby, and means for automatically controlling the generator to regulate both the current in a circuit supplied thereby and the voltage upon a circuit affected by changes in voltage across the battery, and wherein the control of the generator is automatically shifted from current control to voltage control under certain conditions affected by battery voltage and voltage control is accompanied by a falling off in current, of means for accelerating said falling off when the control is shifted from current to voltage.

42. The combination with a variable speed generator, a battery charged thereby, and means for controlling the generator to compensate for speed changes, said means being affected by current supplied to the battery by the generator and by the voltage across the battery while being charged by the generator, and wherein the control of the generator is automatically shifted from current to voltage control under certain conditions, as when the battery becomes charged and voltage control is accompanied by a falling off in charging current, of means for accelerating said falling off when the control is shifted from current to voltage.

43. Regulating means comprehending a regulating element, voltage responsive means, current responsive means, and means affected by and coöperating with one of said responsive means independently of the other responsive means to affect said regulating element.

44. Regulating means comprehending a regulating element, voltage responsive means, current responsive means, and electric means controlled by and coöperating with one of said responsive means independently of the other responsive means to affect said regulating element.

45. Regulating means comprehending a regulating element, voltage responsive means, current responsive means, and electro-magnetic means affected by and coöperating with one of said responsive means independently of the other responsive means to affect said regulating element.

46. Regulating means comprehending means capable of performing a regulating function when acted upon, voltage responsive means and current responsive means each capable of acting thereupon, and means affected by and coöperating with one of said responsive means to modify the operation thereof.

47. Regulating means comprehending means capable of performing a regulating function when acted upon, voltage responsive means and current responsive means each capable of acting thereupon, and means affected by each of said responsive means to independently modify the operation thereof.

48. The combination with a generator and a storage battery charged thereby, of means for automatically regulating the generator comprehending means the regulating effect of which varies with variations in pressure, means for exerting pressure thereon, a current coil in series with the generator and at least a portion of its work, a voltage coil affected by variations in voltage across the battery and generator circuit, separate movable cores coacting with said coils, at least one of said cores being mechanically disconnected from the pressure exerting means and capable of movement without affecting the same, and capable with certain movement of affecting the same, and means coöperating with said core during a portion of its movement to affect the pressure to control the regulating means.

49. The combination with a generator and means for controlling the same, of a plurality of separately movable cores, and means coacting therewith whereby each may affect the controlling means, a voltage responsive coil affecting one of said cores, a current responsive coil affecting another of said cores and electro-magnetic means affected by movement of one of said cores before said core is able to affect the said coacting means.

50. The combination with a generator and a storage battery charged thereby, of means for automatically regulating the generator comprehending means, the regulating effect of which varies with variations in pressure, means for exerting pressure thereon, a current coil in series with the generator and at least a portion of its work, a voltage coil affected by variations in voltage across the battery and generator circuit, separate movable cores coacting with said coils, at least one of said cores being mechanically disconnected from the pressure exerting means and capable of movement without affecting the same, and capable with certain movement of affecting the same, and electro-magnetic means coöperating with said core during a portion of its movement to affect the pressure to control the regulating means, said electro-magnetic means coöperating with one of said coils in controlling the generator.

51. Regulating means comprehending current responsive means, voltage responsive means, regulating means operated thereby independently affected in adjustable degrees by fluctuations in magnetomotive forces of the responsive means, and means whereby said responsive means each assist the other.

52. Regulating means comprehending current responsive means, voltage responsive means, regulating means independently operated thereby, and means whereby the responsive means coöperate in affecting the regulating means.

53. In an electric system, regulating means comprehending current responsive means, voltage responsive means, regulating means independently operated thereby, and means whereby one of the said responsive means may coöperate with the other responsive means in response to an effect produced upon the system by operation of the said one of the responsive means.

54. Regulating means comprehending current responsive means, voltage responsive means, regulating means and means whereby said responsive means may independently operate the same, combined with means whereby said responsive means under predetermined conditions coöperate to affect the regulating means.

55. Regulating means comprehending current responsive means, voltage responsive means, means independently affected thereby in adjustable degree by fluctuations in magnetomotive force of the responsive means, and means whereby said responsive means assist each other in variable degrees.

56. In an electric system, regulating means comprehending current responsive means, voltage responsive means for affecting the same, means independently affected thereby in adjustable degree by fluctuations in magnetomotive force of the responsive means, and means whereby said responsive means assist each other in variable degrees, depending upon the effect produced by the responsive means which is being assisted.

57. The combination with a generator, of means for regulating the same comprehending a regulating element, means for affecting the same in response to voltage fluctuations, means for independently affecting the same in response to current fluctuations, and means whereby current fluctuations modify the operation of the voltage responsive means and voltage fluctuations modify the operation of the current responsive means.

58. Regulating means comprehending a regulating element, a plurality of independently operating responsive means, and means whereby said responsive means may coöperate in affecting the regulating element.

59. The combination with a generator and regulating means controlling the same, of a plurality of means for affecting said regulating means independently in response to a plurality of functions of said generator, and means whereby said responsive means may each coöperate with the other in affecting the regulating means.

60. The combination with a generator and a pressure responsive means for regulating the same, of current responsive and voltage responsive means capable of independently affecting said regulating means, and means whereby the said responsive means may coöperate in the regulation of the generator.

61. Regulating means comprehending current responsive means, voltage responsive means, means operated thereby affected in functionally different degree by equivalent fluctuations in magnetomotive force of the responsive means and means whereby said responsive means assist each other.

62. Regulating means comprehending current responsive means, voltage responsive means, means operated thereby affected in different degree by equivalent fluctuations in magnetomotive force of the responsive means and means whereby said responsive means assist each other in different degrees.

63. The combination with a generator of means for regulating the same comprehending a regulating element, means for affecting the same in response to voltage fluctuations, means for affecting the same in response to current fluctuations and means whereby current fluctuations affect the voltage responsive means while the voltage responsive means is regulating the generator.

64. The combination with a generator of means for regulating the same comprehending a regulating element, means for affecting the same in response to voltage fluctuations, means for affecting the same in response to current fluctuations and means whereby current fluctuations affect the operation of the voltage responsive means while the voltage responsive means is predominating in the regulation of the generator.

65. The combination with a generator of means for regulating the same comprehending a regulating element, a lever affecting the same, voltage responsive means capable of affecting said lever, current responsive means capable of affecting said lever, and means whereby said responsive means coöperate to adjust a standard of operation while the voltage responsive means is predominating in the regulation of the generator.

66. The combination with a generator and a storage battery of means for regulating the generator comprehending a regulating element, current responsive means for affecting the same, voltage responsive means for affecting the same, and means whereby rise in voltage across the battery by affecting the voltage responsive means causes the current responsive means to assist the voltage responsive means in decreasing the charging current.

67. Regulating means comprehending current responsive means, voltage responsive means, and means operated thereby affected in functionally different degrees by like mechanical efforts applied thereto by said responsive means including power increasing means through which the voltage responsive means engages and disengages said operated means.

68. Regulating means comprehending current responsive means capable of operating the same, normally ineffective voltage responsive means and means whereby the voltage responsive means may affect the current responsive means in such greater degree upon fluctuations in magneto-motive force than the current responsive means is affected by equivalent fluctuations that the voltage responsive means usurps substantially the entire regulating function when affecting the current responsive means.

69. Regulating means comprehending current responsive means, voltage responsive means and means operated thereby affected independently by the current responsive means and in such magnified degree by the voltage responsive means upon equivalent fluctuations in mechanical efforts of the responsive means that the voltage responsive means usurps substantially the entire regulating function when affecting the current responsive means and causes regulation for substantially constant voltage.

70. The combination with a generator and a regulating element for affecting the same, of means for operating the said element to increase and to decrease the activity of the generator, a member controlling said means, and electromagnetic means controlling said member independently responsive to voltage and current fluctuations.

71. The combination with a generator and storage battery charged thereby, of means for regulating the generator, electromagnetic controlling means therefor, means for affecting the operation of said controlling means, voltage responsive means for operating said last named means, and current responsive means for independently operating the same.

72. The combination with a variable speed generator and storage battery charged thereby, of means for limiting the current and voltage of the generator comprising a regulating element, means normally tending to operate said element to decrease the resistance thereof, electromagnetic means for operating the same to increase the resistance thereof, circuit changing means for controlling said electromagnetic means, voltage responsive means for operating said circuit changing means, and current responsive means for operating said circuit changing means.

73. The combination with a variable speed generator and storage battery charged thereby, of means for regulating the generator to limit the current and voltage thereof comprehending a carbon pile, electromagnetic means causing the pressure upon said pile to be varied upon changes in electrical connections thereof, and means for changing the said connections affected by voltage and current fluctuations.

74. The combination with a medium the resistance of which varies with variations in pressure thereon, of means normally tending to exert a predetermined pressure upon said medium, a plurality of movable magnetic members at least one of which is mechanically disconnected from said means and capable of movement without affecting the pressure upon said medium, voltage and current responsive means coacting with said magnetic members to move the same and to vary the pressure exerted by the first mentioned means upon said medium to independently limit current and voltage values affected by the operation of said medium.

75. The combination with a medium the resistance of which varies with variations in pressure thereon, of means normally tending to exert a predetermined pressure upon said medium, a plurality of movable cores at least one of which is mechanically disconnected from said means and capable of movement without affecting the pressure upon said medium, voltage and current responsive means coacting with said cores to move the same and to vary the pressure exerted by the first mentioned means upon said medium to independently limit current and voltage values affected by the operation of said medium.

76. The combination with a generator, means for regulating the same, means for affecting said regulating means in response to current fluctuations, and means for affecting said regulating means in response to voltage fluctuations, of means whereby the operation of either responsive means affects the regulating action of the other responsive means.

77. The combination with a generator, a storage battery and translating devices receiving current therefrom, regulating means for affecting the operation of the generator, current responsive means for affecting said regulating means, voltage responsive means for affecting said regulating means, and means whereby the operation of one responsive means affects the standard of operation of the other responsive means.

78. The combination with a generator and a storage battery charged thereby, of means capable of regulating the generator when properly manipulated, manipulating means coöperating therewith to regulate the generator, current responsive and voltage responsive means for separately affecting the manipulating means, and means whereby the voltage responsive means is affected by the action of the current responsive means to decrease the charging current.

79. An electrical regulator including a series of contacting units, a member engaging and normally tending to compress the same, and two independently movable members mechanically separated from said member, each of which is adapted to engage and move said member to lessen the compression of said series of units.

80. A series of contacting electrodes and means for lessening the aggregate resistance of the same, by either of two magnets, comprising a member engaging said series of electrodes, two magnets operating independently movable members mechanically separated from said engaging member when said magnets are insufficiently energized to move their respective movable members but engaging and moving the said first mentioned member in the said direction when the respective magnets are sufficiently energized.

81. A carbon pile, a lever engaging the same, two independently movable members mechanically separate from said lever and two magnets each arranged to act upon one of said members to move it into engagement with said lever to move its engaging end in a direction away from the pile.

82. In an electrical system wherein a variable speed dynamo charges a storage battery and is automatically regulated to correct against speed changes, responsive means of the voltage type and responsive means of the current type adapted to each regulate the generator, one of said responsive means being adapted to supersede the other in regulating the generator, means dependent upon the coming into action of the superseding responsive means adapted to assist it in completing the putting out of action of the other responsive means.

83. A regulator comprising a regulating element, a lever for affecting said element, current responsive means and voltage responsive means each adapted to separately operate said lever without affecting the other responsive means.

84. A regulator comprising a regulating element, a lever for affecting said element, current responsive means and voltage responsive means each adapted to separately operate said lever without being affected by the other responsive means.

85. A regulator comprising a regulating element, a lever for affecting said element, current responsive means and voltage responsive means each adapted to control the position of said lever independently of the other.

86. A regulator comprising a regulating element, a lever for affecting said element, current responsive means and voltage responsive means each mechanically independent of the other and each mechanically independent of said lever and each adapted to independently operate said lever to control the regulating element.

87. A regulator comprehending a regulating element, a lever for affecting said element, current responsive means and voltage responsive means each mechanically independent of the other and each adapted to operate said lever independently of the other.

88. A regulator comprehending a regulating element, current responsive means, voltage responsive means, a movable member affecting said element and unaffected by either of said responsive means when said responsive means are ineffectively energized and independently operated by each of said responsive means when effectively energized.

89. A regulator comprising a regulating device, movable means for controlling the same, a plurality of responsive means each capable of controlling the position of the entire movable means independently of the other responsive means.

90. A regulator comprehending a regulating device, movable means for controlling the same, a plurality of movable responsive means each capable of controlling the position of the movable means which is then unaffected by the position of the other responsive means.

91. A regulator comprehending a compressible regulating element, a lever normally tending to exert a given pressure upon said element, independent current responsive means and voltage responsive means each adapted to affect said lever independently of the other and control the regulating effect of said element.

92. An electric regulator comprehending a regulating element, movable means for affecting said element, current responsive means and voltage responsive means each adapted to operate said movable means independently of the other and each permitting movement of said movable means without affecting the responsive means.

93. The combination with a regulating element and a movable member for affecting the same, of a plurality of independent responsive means each adapted to move said movable member and so arranged with respect thereto that when one responsive means is controlling the movable member another may usurp control thereof and operate the same in one direction, and the element is then unaffected by operation of another responsive means in another direction.

94. A regulator comprehending a regulating element, voltage responsive means, current responsive means and a common operating means capable of producing a given effect upon said element unaided by said responsive means, and by operating which each of the responsive means may affect the regulating element independently of the other responsive means.

95. A regulator comprehending a regulating element, a movable member for affecting the said element, a plurality of independent responsive means each capable of moving said member in one direction irrespective of the other responsive means and in an opposite direction only as permitted by the other responsive means.

96. The combination with a dynamo driven at variable speed, a storage battery charged thereby and regulating means controlling the electrical operation of the dynamo, of a movable member the position of which controls said regulating means, current responsive means affected by current supplied by the dynamo to the battery and voltage responsive means affected by the voltage held across the battery, said responsive means each being independently capable of controlling the position of said movable means which when so controlled is independent of the position of the other responsive means.

JOHN L. CREVELING.

Witnesses:
J. P. CREVELING,
MARY MONTAGUE.